US011208901B2

(12) United States Patent
Bunker et al.

(10) Patent No.: US 11,208,901 B2
(45) Date of Patent: Dec. 28, 2021

(54) TRAILING EDGE COOLING FOR A TURBINE BLADE

(71) Applicant: General Electric Company, Schenectady, NY (US)

(72) Inventors: Ronald Scott Bunker, West Chester, OH (US); Zachary Daniel Webster, Mason, OH (US)

(73) Assignee: General Electric Company, Schenectady, NY (US)

( * ) Notice: Subject to any disclaimer, the term of this patent is extended or adjusted under 35 U.S.C. 154(b) by 102 days.

(21) Appl. No.: 16/423,313

(22) Filed: May 28, 2019

(65) Prior Publication Data

US 2019/0316473 A1 Oct. 17, 2019

Related U.S. Application Data

(62) Division of application No. 14/958,082, filed on Dec. 3, 2015, now Pat. No. 10,344,598.

(51) Int. Cl.
*F01D 5/18* (2006.01)
*F01D 9/04* (2006.01)
*F01D 25/12* (2006.01)

(52) U.S. Cl.
CPC ............ *F01D 5/187* (2013.01); *F01D 9/041* (2013.01); *F01D 25/12* (2013.01);
(Continued)

(58) Field of Classification Search
CPC . F01D 5/18; F01D 5/186; F01D 5/187; F01D 9/04; F01D 9/041; F01D 9/042;
(Continued)

(56) References Cited

U.S. PATENT DOCUMENTS

| 4,601,638 A | 7/1986 | Hill et al. |
| 5,281,084 A | 1/1994 | Noe et al. |

(Continued)

FOREIGN PATENT DOCUMENTS

| CN | 1429968 A | 7/2003 |
| CN | 101769170 A | 7/2010 |

(Continued)

OTHER PUBLICATIONS

Extended European Search Report and Opinion issued in connection with corresponding EP Application No. 16200548.2 dated Apr. 12, 2017.

(Continued)

*Primary Examiner* — Christopher Verdier
*Assistant Examiner* — Elton K Wong
(74) *Attorney, Agent, or Firm* — McGarry Bair PC

(57) ABSTRACT

A component for a gas turbine engine comprises an airfoil having an outer surface. One or more cooling passages can be disposed within the airfoil, having a cooling passage extending along a trailing edge. A plurality of cooling channels can extend from the cooling passage through the trailing edge. At least one flow element and at least one film hole can be disposed in the cooling channel or the trailing edge passage adjacent the cooling channel. The flow element and the film hole can be in a predetermined relationship with one another providing improved flow to the film hole.

18 Claims, 8 Drawing Sheets

(52) U.S. Cl.
CPC .... *F05D 2220/32* (2013.01); *F05D 2240/122* (2013.01); *F05D 2240/304* (2013.01); *F05D 2250/231* (2013.01); *F05D 2260/202* (2013.01); *F05D 2260/2212* (2013.01); *Y02T 50/60* (2013.01)

(58) Field of Classification Search
CPC .... F01D 25/12; Y02T 50/60; F05D 2260/202; F05D 2260/2212; F05D 2240/122; F05D 2240/304
See application file for complete search history.

(56) References Cited

U.S. PATENT DOCUMENTS

| | | | |
|---|---|---|---|
| 5,779,438 | A | 7/1998 | Wilfert |
| 6,325,593 | B1 | 12/2001 | Darkins, Jr. et al. |
| 6,422,819 | B1 * | 7/2002 | Tsai ................. F01D 5/187 |
| | | | 416/97 R |
| 6,474,947 | B1 * | 11/2002 | Yuri ................. F01D 5/186 |
| | | | 416/97 R |
| 6,837,683 | B2 | 1/2005 | Dailey |
| 7,901,183 | B1 | 3/2011 | Liang |
| 2003/0007864 | A1 | 1/2003 | Shelton et al. |
| 2003/0133795 | A1 | 7/2003 | Manning et al. |
| 2005/0244264 | A1 | 11/2005 | Jacks et al. |
| 2007/0128028 | A1 | 6/2007 | Liang |
| 2010/0074762 | A1 | 3/2010 | Liang |
| 2015/0016961 | A1 | 1/2015 | Shepherd |
| 2016/0090846 | A1 * | 3/2016 | Riley ................. F01D 9/041 |
| | | | 415/115 |
| 2017/0145831 | A1 | 5/2017 | Bunker |
| 2017/0145921 | A1 | 5/2017 | Bunker |
| 2017/0159449 | A1 | 6/2017 | Buhler et al. |
| 2017/0159450 | A1 | 6/2017 | Buhler et al. |
| 2017/0167268 | A1 | 6/2017 | Bunker |

FOREIGN PATENT DOCUMENTS

| | | |
|---|---|---|
| EP | 0798448 A2 | 10/1997 |
| EP | 0990772 A2 | 4/2000 |
| EP | 2149676 A1 | 2/2010 |
| EP | 2236752 A2 | 10/2010 |

OTHER PUBLICATIONS

Machine Translation and First Office Action and Search issued in connection with corresponding Chinese Application No. 201611095392.X dated Feb. 24, 2018.

Second Office Action and Search issued in connection with corresponding Chinese Application No. 201611095392.X dated Nov. 19, 2018 (Translation Not Available).

* cited by examiner

TRAILING EDGE COOLING FOR A TURBINE BLADE

CROSS-REFERENCE TO RELATED APPLICATIONS

This application is a Divisional Application of and claims priority to U.S. patent application Ser. No. 14/958,082, filed Dec. 3, 2015, now U.S. Pat. No. 10,344,598, issued Jul. 9, 2019, the entirety of which is incorporated herein by reference. This application is also related to Chinese Application 201611095392X, which was filed Dec. 2, 2016.

TECHNICAL FIELD OF THE INVENTION

This disclosure generally relates to a component or airfoil for a turbine engine which includes a predetermined relationship among a film hole upstream and a trailing edge cooling channel, with the film hole provided in a cooling passage upstream of the trailing edge cooling channel.

BACKGROUND

Turbine engines, and particularly gas or combustion turbine engines, are rotary engines that extract energy from a flow of gases passing through the engine in a series of compressor stages, which include pairs of rotating blades and stationary vanes, through a combustor, and then onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine thrust, so cooling of certain engine components, such as the rotor post is necessary during operation. Typically, cooling is accomplished by ducting cooler air from the high and/or low pressure compressors to the engine components, which require cooling.

Flow elements placed on a surface complementary to a plurality of film holes within the cooling flow can be utilized as a thermal cooling feature, however, the flow elements can generate an unsteady flow as the cooling flow passes over them. The unsteady flow can provide an unsteady stream of fluid to the film holes reducing film cooling efficiency.

BRIEF DESCRIPTION OF THE INVENTION

In one aspect, the disclosure relates to a component for a gas turbine engine comprising an airfoil having an outer surface extending chord-wise from a leading edge to a trailing edge and span-wise from a root to a tip, a cooling passage located within the airfoil and extending along the trailing edge, at least one trailing edge cooling channel extending from the cooling passage through the trailing edge, and at least one film hole having an inlet in the cooling passage, an outlet on the outer surface, and a passage connecting the inlet and the outlet. The inlet is located in the cooling passage in a predetermined relationship to the trailing edge cooling channel.

In another aspect, the disclosure relates to a turbine engine comprising: a core engine comprising a casing at least partially surrounding a high pressure compressor, a combustor, and a high pressure turbine in a serial flow arrangement; an airfoil, provided in one of the compressor or the combustor, having an outer surface extending chord-wise from a leading edge to a trailing edge and span-wise from a root to a tip; a cooling passage located within the airfoil and extending along the trailing edge; at least one trailing edge cooling channel extending from the cooling passage through the trailing edge; and at least one film hole having an inlet in cooling passage, an outlet on the outer surface, and a passage connecting the inlet and the outlet; wherein the inlet is located in the cooling passage in a predetermined relationship to the trailing edge cooling channel.

DESCRIPTION OF EMBODIMENTS OF THE INVENTION

Figure 1:
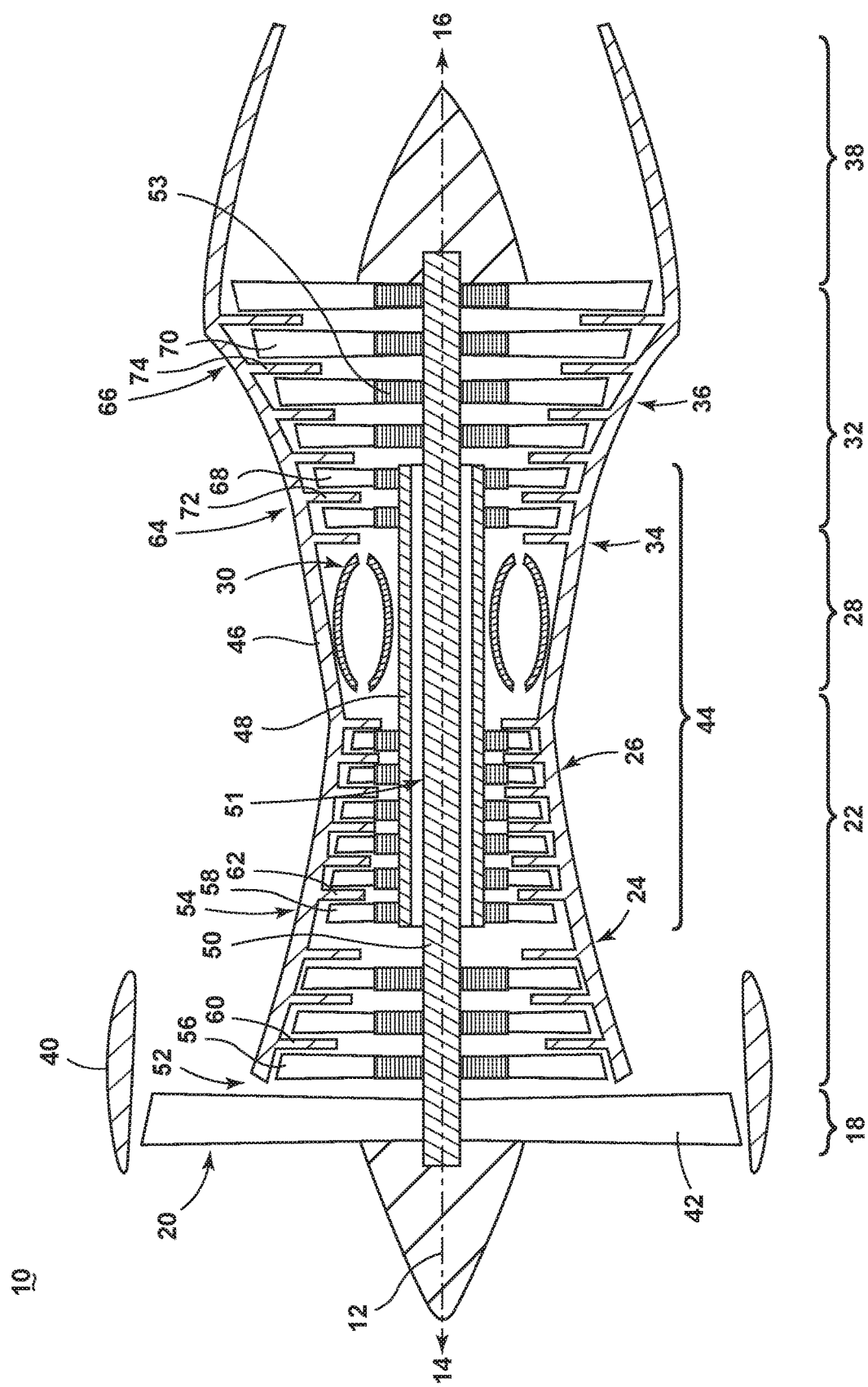
FIG. 1 is a schematic, sectional view of a gas turbine engine.

The described embodiments of the present invention are directed to apparatuses, methods, and other devices related to routing airflow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

It should be further understood that for purposes of illustration, the present invention will be described with respect to an airfoil for a turbine blade of the turbine engine. It will be understood, however, that the invention is not limited to the turbine blade, and can comprise any airfoil structure, such as a compressor blade, a turbine or compressor vane, a fan blade, a strut, a shroud assembly, or a combustor liner or any other engine component requiring cooling in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

Furthermore, as used herein, the terms "stream-wise" or "streamline," or similar nomenclature when used with flow, fluid, gas, location, or alignment refers to a fluid or gas flow direction which can be linear or a vector of the flow where the flow is non-linear, where the direction of the flow is moving at any position or point in time.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
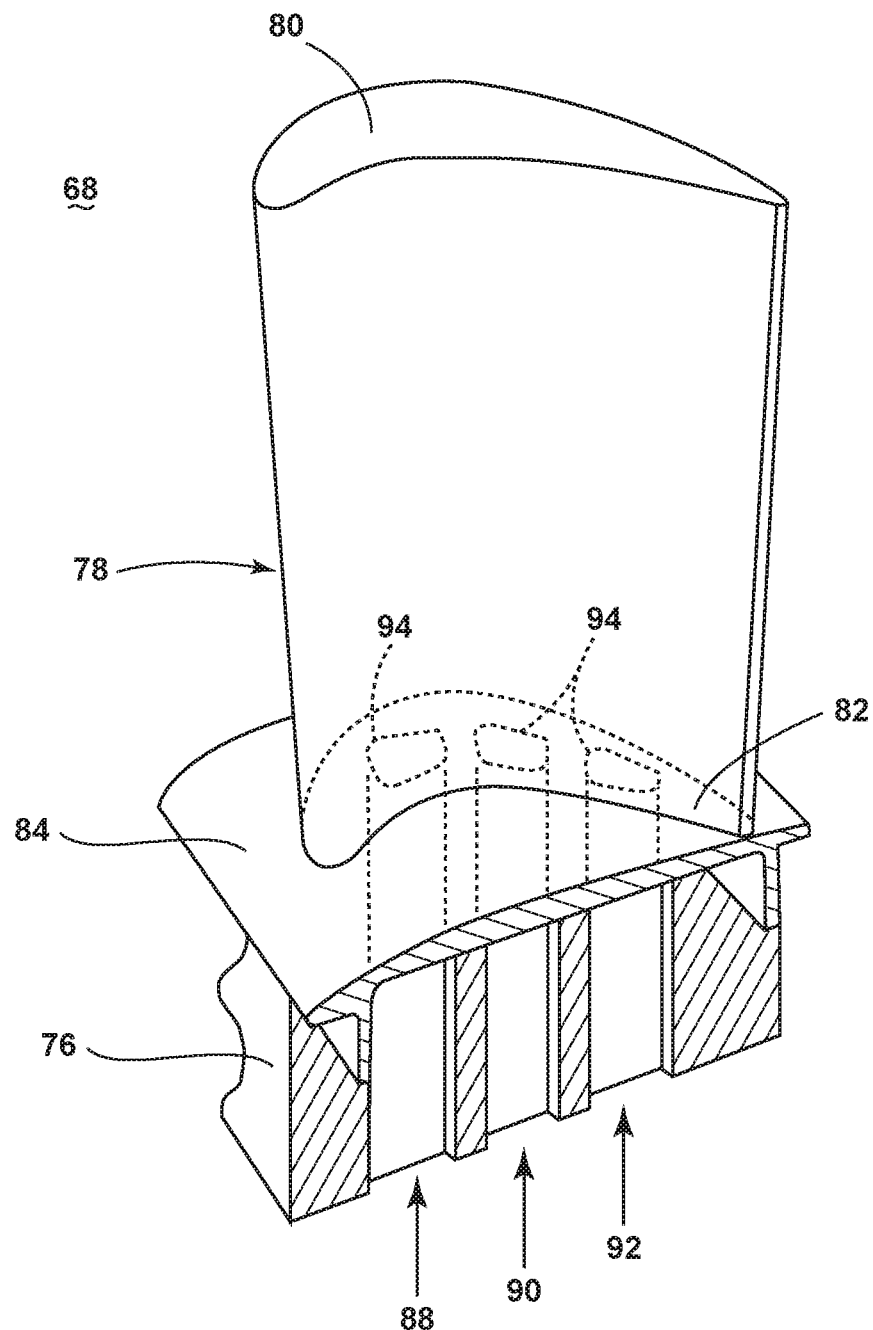
FIG. 2 is a perspective view of an engine component in the form of a turbine blade of the engine of FIG. 1.

FIG. 2 is a perspective view of an engine component in the form of one of the turbine blades 68 of the engine 10 from FIG. 1. The turbine blade 68 includes a dovetail 76 and an airfoil 78. The dovetail 76 can be configured to mount to a turbine rotor disk on the engine 10. The airfoil 78 extends from a tip 80 to a root 82 defining a span-wise direction. The dovetail 76 further includes a platform 84 integral with the airfoil 78 at the root 82, which helps to radially contain the turbine airflow. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. The inlet passages 88, 90, 92 as shown are exemplary should not be understood as limiting. More or less inlet passages can be used to provide a flow of fluid internal of the airfoil 78. It should be appreciated that the dovetail 76 is shown in cross-section, such that the inlet passages 88, 90, 92 are housed within the body of the dovetail 76. It should be further appreciated that as described herein, the engine component is described as an airfoil 78, however, this should not be construed as limiting and additional engine components such as a blade, vane, strut, or shroud assembly, in non-limiting examples, can be substituted for the airfoil.

Figure 3:
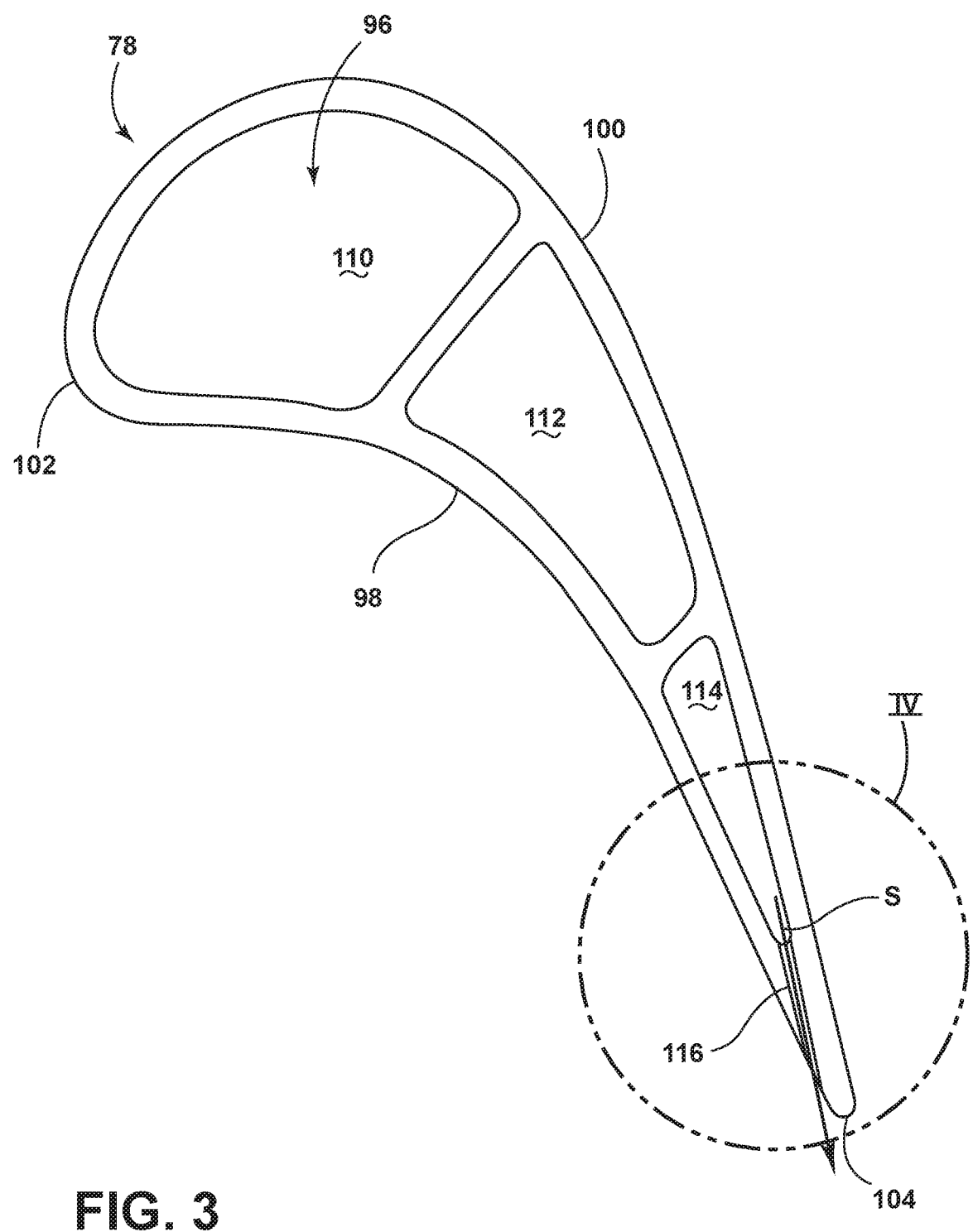
FIG. 3 is a cross-sectional view of the blade of FIG. 2 illustrating a trailing edge cooling channel.

Turning to FIG. 3, the airfoil 78, shown in cross-section, has an outer wall defining a concave-shaped pressure wall 98 and a convex-shaped suction wall 100 which are joined together to define an airfoil shape. A leading edge 102 and a trailing edge 104 define a chord-wise direction extending therebetween. The airfoil 78 rotates in a direction such that the pressure wall 98 follows the suction wall 100. Thus, as shown in FIG. 3, the airfoil 78 would rotate upward toward the top of the page.

The airfoil 78 comprises an interior 96 defined by a first cooling passage 110, a second cooling passage 112, and a trailing edge cooling passage 114. The trailing edge cooling passage 114 comprises a trailing edge cooling channel 116 extending from the trailing edge cooling passage 114 through the pressure sidewall 98 adjacent the trailing edge 104. Alternatively, the cooling channel 116 can extend through the trailing edge 104 or the suction sidewall 100. A flow of fluid stream-wise gas S, such as a cooling fluid, can pass from the trailing edge cooling passage 114 through the cooling channel 116 and exhaust at the trailing edge 104 of the airfoil 78.

Figure 4:
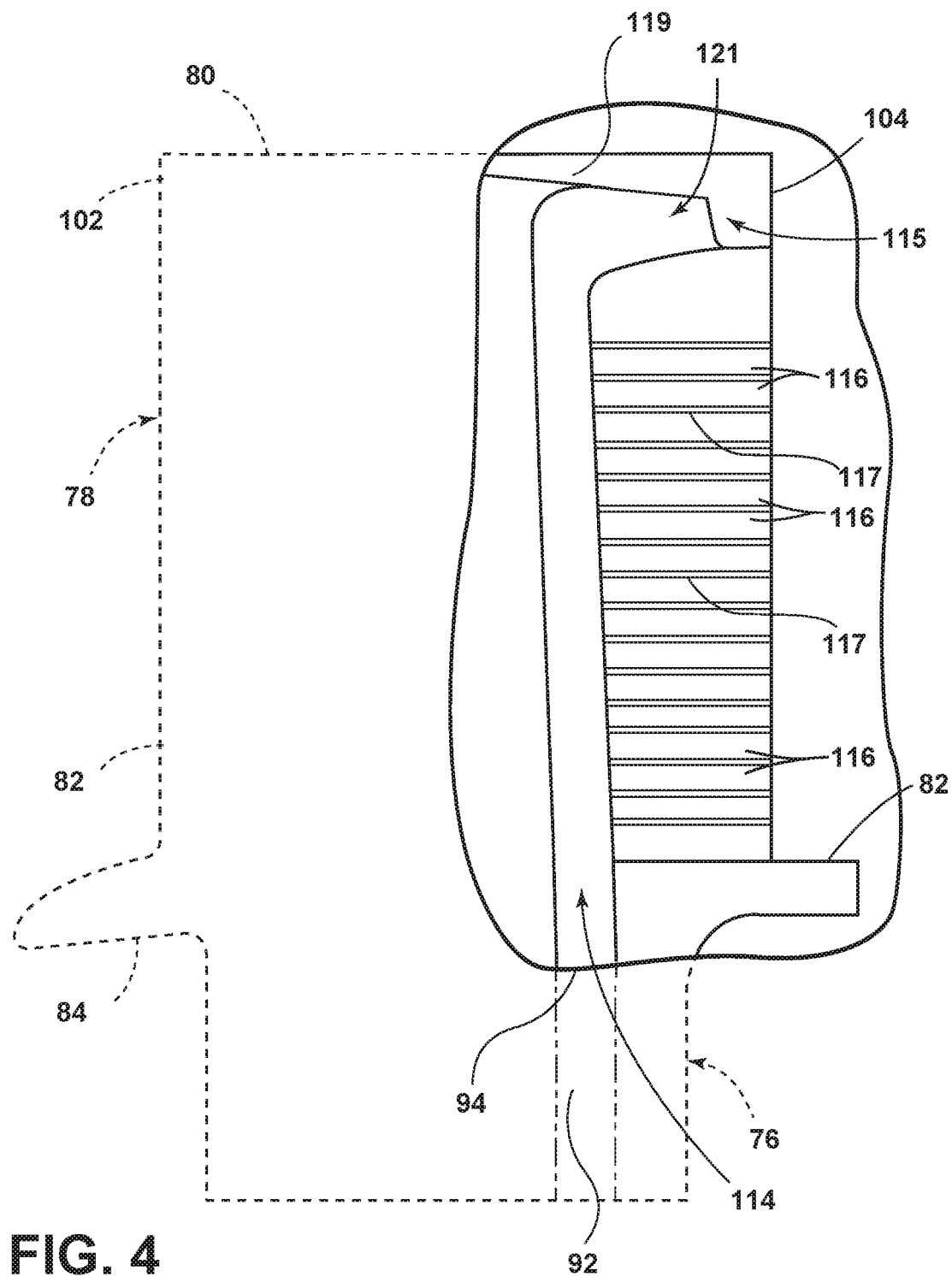
FIG. 4 is a radial cross-section of the blade of FIG. 2 illustrating multiple trailing edge cooling channels.

In FIG. 4, illustrating a radial cross-section of the airfoil 78, the airfoil comprises multiple cooling channels 116, defined within a trailing edge wall 117. One can appreciate that the trailing edge passage 114 is in fluid communication with the third inlet passage 92 at the passage outlet 94. The trailing edge passage 114 feeds the plurality of cooling channels 116, and exhausts any remaining gas through an exhaust outlet 121 at a tip flag 115. Furthermore, an air fed toward the tip 80 can exhaust into a tip channel 119, which can join with the gas exhausting from the exhaust outlet 121 at the tip flag 115. It should be understood that the cooling configuration shown in FIG. 4 is exemplary, and should not be understood as limiting.

Figure 5:
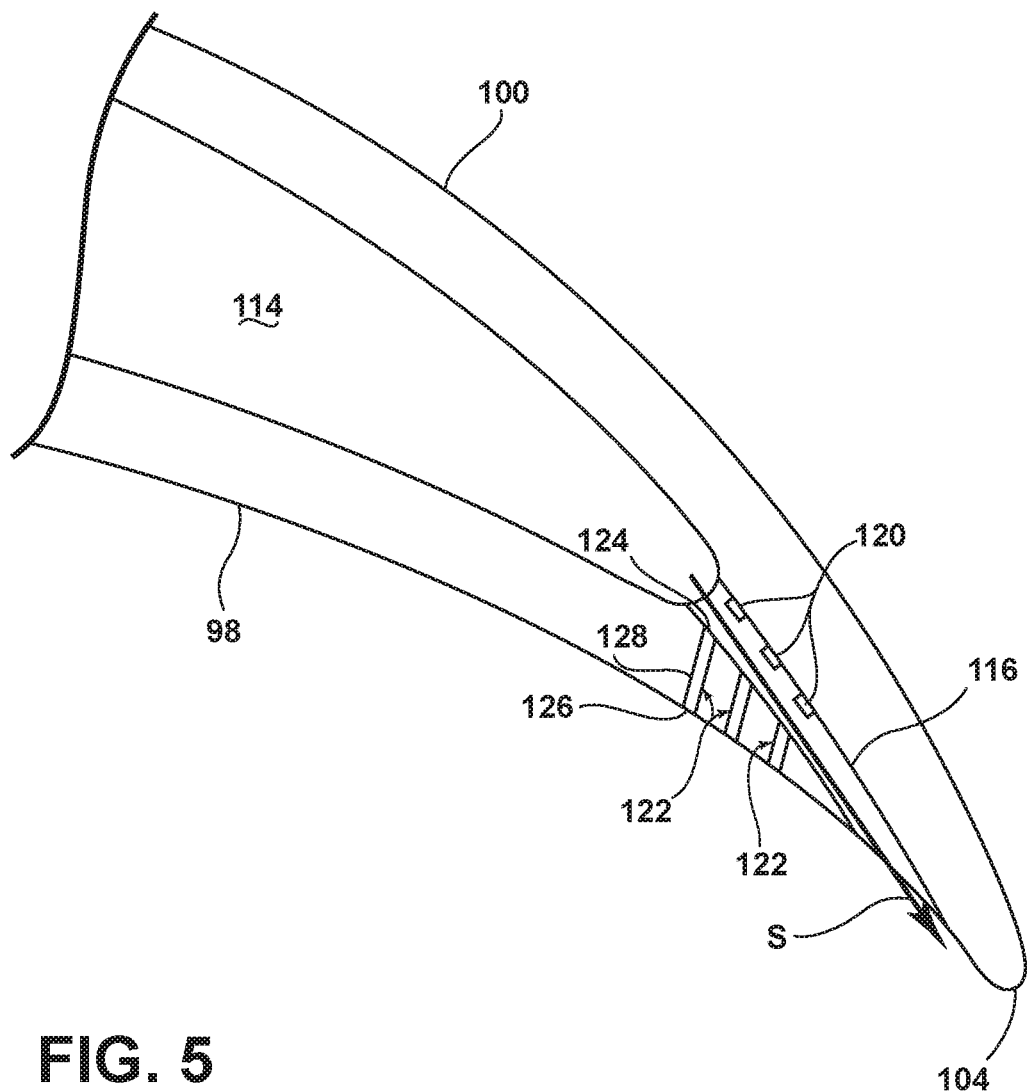
FIG. 5 is an enlarged view of the trailing edge of the blade of FIG. 3 comprising flow elements within the cooling channel.

Turning to FIG. 5, the cooling channel 116 comprises a plurality of flow elements 120 and a plurality of film holes 122. The flow elements 120 can comprise turbulators, pins or pin banks, or mesh in non-limiting examples. The flow elements 120 can be discrete members, with multiple flow elements 120 disposed radially along the cooling channel 116, or can be a single elongated member extending along a portion of or the entire radial length of the cooling channel 116. The film holes 122 can have an inlet 124 disposed in the cooling channel 116, an outlet 126 disposed on the pressure sidewall 98 and a passage 128 connecting the inlet 124 to the outlet 126. While the film holes 122 are illustrated on the pressure side 98, they can alternatively be placed on the suction side 100.

The flow elements 120 are disposed across from the film holes 122 such that the inlets 124 for the film holes 122 are located in the cooling channel 116 in a predetermined relationship to the flow element 120. The predetermined relationship comprises the inlet 124 of the film hole 122 being located on an opposite side of the cooling channel 116 from the flow elements 120. The flow elements 120 are disposed on the wall of the cooling channel 116 in the same stream-wise location. Alternatively, the predetermined relationship can be defined by the same location based upon the centerline of the cooling channel 116 rather than the streamline flow S. The stream-wise location can be defined as the distance along the cooling channel 116 in the direction of the stream-wise flow S through the cooling channel 116. Additionally, the film holes 122 and the flow elements 120 can be arranged in pairs, such that the predetermined relationship comprises a pair of one film hole 122 and one flow element 120.

It should be understood that the number of film holes and flow elements are exemplary. There can be more or less film holes and flow elements than as shown. Furthermore, there need not be the same number of film holes and flow elements.

Figure 6:
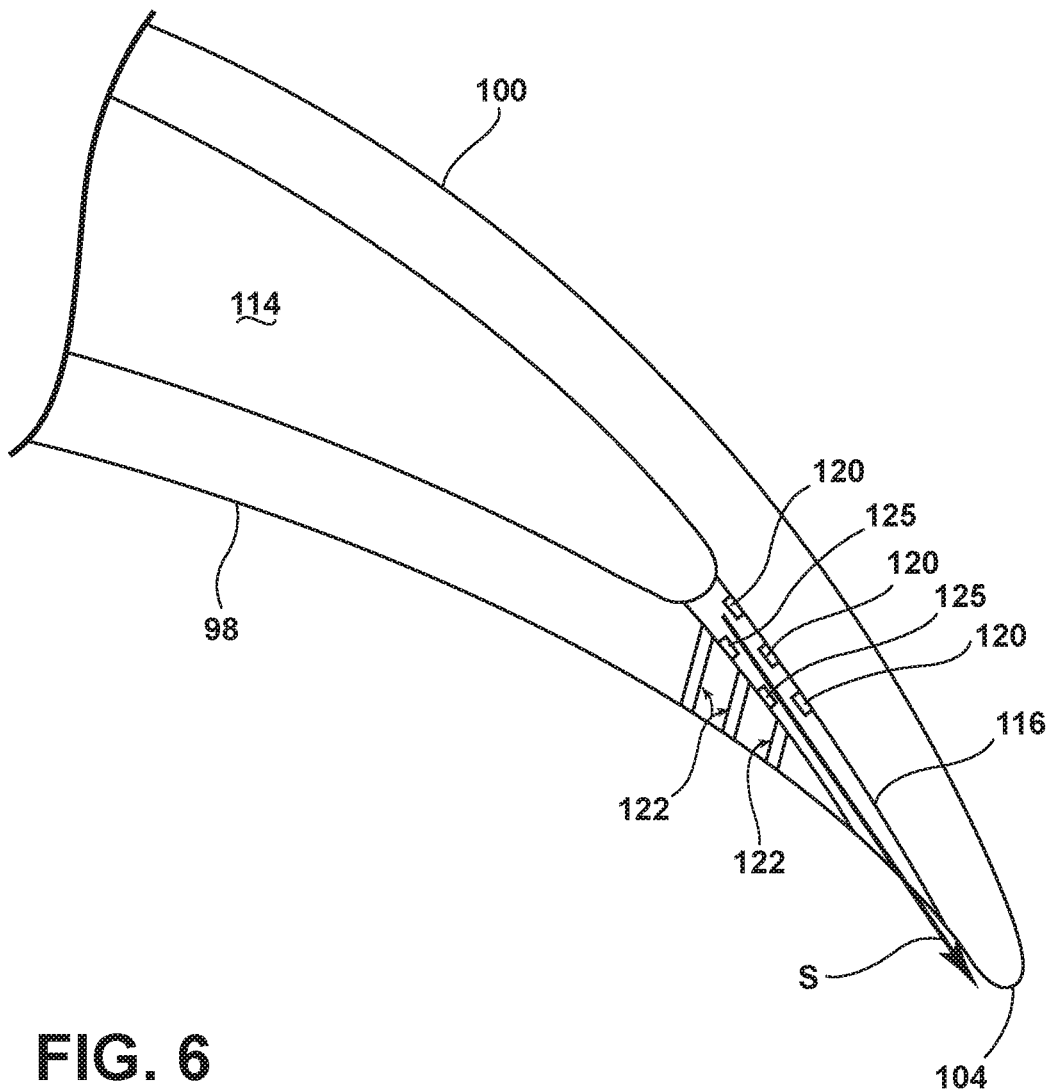
FIG. 6 is an enlarged view of the trailing edge illustrating flow elements on both sides of the cooling channel.

Turning now to FIG. 6, an additional example illustrates additional flow elements 125 disposed on the wall of the cooling channel 116. The additional flow elements 125 are disposed between the film hole inlets 124. It should be appreciated that flow elements 125 on the same sidewall as the film holes 122 need not be utilized in combination with the flow elements 120 opposite of the film holes 122.

Figure 7:
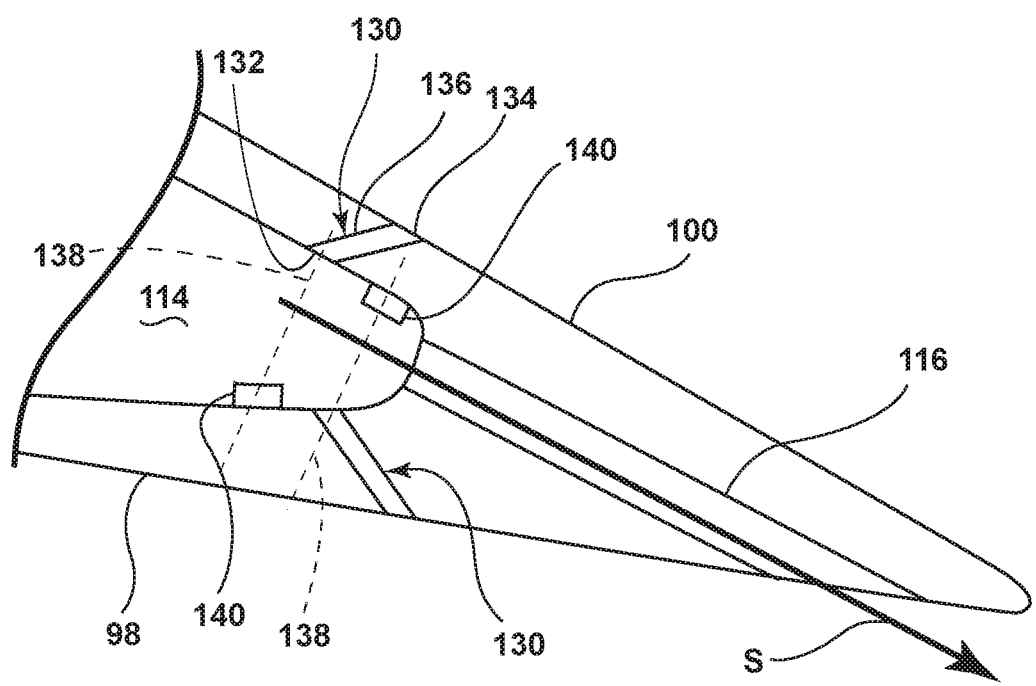
FIG. 7 is a further enlarged view of the trailing edge illustrating flow elements within a cooling passage.

FIG. 7 illustrates another example having a plurality of film holes 130 disposed in the trailing edge passage 114 upstream of the cooling channel 116 relative to the stream-wise flow. There are two exemplary film holes 130 shown, one on the pressure sidewall 98 and one on the suction sidewall 100. It should be appreciated that the position and geometry of the film holes 130 are exemplary. The film holes can be placed nearer or farther from the cooling channel 116, and can comprise a plurality of film holes 130 disposed radially along the length of the airfoil 78. Each film hole 130 comprises an inlet 132 disposed in the trailing edge passage 114 and an outlet 134 disposed on the outer surface, such as the pressure or suction sidewalls 98, 100. A passage 136 fluidly couples the inlet 132 to the outlet 134.

A plurality of flow elements 140 are disposed within the trailing edge passage 114. The flow elements 140 are disposed opposite of the film holes 130 and can be disposed across from a film hole 130 in a predetermined relationship such that the flow elements 140 are spaced stream-wise from one another upstream of the cooling channel 116. Two stream-wise axes 138 are illustrated, disposed orthogonal to the stream wise flow S, such that the film hole 130 and the associated flow element 140 are aligned in the predetermined relationship relative to the stream-wise flow S. Alternatively, the predetermined relationship can be relative to a centerline of the cooling channel 116. Additionally, it should be appreciated that the flow elements as shown in FIG. 7 are optional, and can comprise a trailing edge passage configuration with only the film holes 130 or some of the flow elements 140.

It should be appreciated that the flow elements 140 can be multiple flow elements 140 disposed radially along the surface of the trailing edge passage 114. Additionally, there can be multiple complementary film holes associated with the multiple flow elements.

Figure 8:
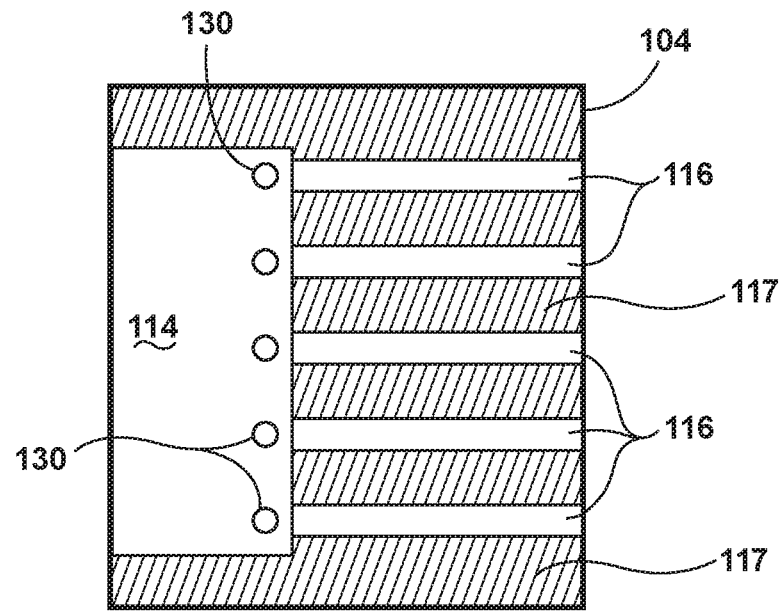
FIG. 8 is a schematic side view of the trailing edge having a plurality of film holes aligned with the cooling channels.

Turning now to FIG. 8, a radial schematic of the trailing edge passage 114 and the trailing edge cooling channels 116 best illustrates multiple trailing edge cooling channels 116 disposed radially along the trailing edge of the airfoil 78. The plurality of film holes 130 can be disposed radially along the trailing edge passage 114 aligned with the trailing edge cooling channels 116. As such, an airflow entering the trailing edge cooling channels 116 will feed the film hole 130 prior to entering the trailing edge cooling channels 116.

Figure 9:
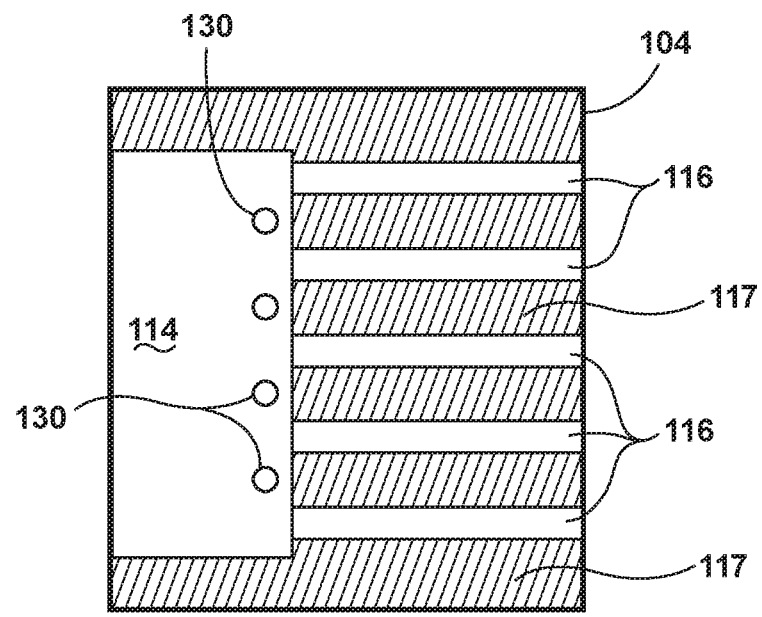
FIG. 9 is a schematic side view of the trailing edge having a plurality of film holes offset from the cooling channels.

Alternatively, in FIG. 9, the film holes 130 can be disposed offset from the trailing edge cooling channel 116. Thus, a flow of air entering the trailing edge cooling channels 116 will not be disrupted by the airflows entering the film holes 130.

Thus, the placement of the film holes 130 as shown in FIGS. 8 and 9 can be utilized in combination with the alignments of the flow elements and the film holes 130 as shown in FIG. 7 to place film holes 130 near the trailing edge relative to both a cooling channel 116 and the flow element 140.

It should be appreciated that the relative geometric placement of the film hole inlets to the airfoil trailing edge features, such as the flow elements, which can comprise turbulators, pins or pin banks, or mesh, can be beneficial to the film hole inlet flows and the film hole discharge coefficients. Additionally the placement of the flow elements in the channel entry or upstream of the channel can facilitate flow entry into the film holes or the cooling channels. The film holes can be substantially lined up with the placement of the flow elements to generate the beneficial flow.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine comprising:
   an airfoil having an outer surface extending chord-wise from a leading edge to a trailing edge and span-wise from a root to a tip;
   a cooling passage located within the airfoil and extending along the trailing edge;
   at least one trailing edge cooling channel extending from the cooling passage to the outer surface at the trailing edge, defining a stream-wise flow through the at least one trailing edge cooling channel; and
   at least one film hole having an inlet in the cooling passage, an outlet on the outer surface, and a passage connecting the inlet and the outlet; and
   at least one turbulator provided in the cooling passage;
   wherein the at least one turbulator and the inlet of the at least one film hole are spaced in the cooling passage in a predetermined relationship defining an axis extending between the at least one turbulator and the inlet of the at least one film hole, with the axis arranged orthogonal to the stream-wise flow.

2. The component of claim 1 wherein the inlet is aligned with the at least one trailing edge cooling channel relative to the span-wise direction.

3. The component of claim 2 wherein the inlet of the at least one film hole is aligned with a centerline of the at least one trailing edge cooling channel relative to the stream-wise flow.

4. The component of claim 1 wherein the inlet is stream-wise non-aligned with the at least one trailing edge cooling channel relative to the stream-wise flow.

5. The component of claim 1 wherein the component is one of a rotating blade or a stationary vane.

6. The component of claim 1 wherein the at least one trailing edge cooling channel comprises multiple trailing edge cooling channels.

7. The component of claim 6 wherein the inlet of the at least one film hole is located between two adjacent trailing edge cooling channels of the multiple trailing edge cooling channels in the span-wise direction.

8. The component of claim 7 wherein the at least one film hole comprises multiple film holes and the inlets of the multiple film holes are located between pairs of adjacent trailing edge cooling channels of the multiple trailing edge cooling channels.

9. A turbine engine comprising:
   a core engine comprising a casing at least partially surrounding a high pressure compressor, a combustor, and a high pressure turbine in a serial flow arrangement;
   an airfoil, provided in one of the compressor or the combustor, having an outer surface extending chord-wise from a leading edge to a trailing edge and span-wise from a root to a tip;
   a cooling passage located within the airfoil and extending along the trailing edge;
   at least one trailing edge cooling channel extending from the cooling passage through the trailing edge to define a stream-wise flow through the at least one trailing edge cooling channel;
   at least one film hole having an inlet in the cooling passage, an outlet on the outer surface, and a passage connecting the inlet and the outlet; and
   at least one turbulator provided in the cooling passage;
   wherein the inlet of the at least one film hole is located in the cooling passage in a predetermined relationship to align with the at least one turbulator to define an axis between the at least one turbulator and the inlet of the at least one film hole, with the axis being arranged orthogonal to the stream-wise flow.

10. The turbine engine of claim 9 wherein the inlet of the at least one film hole is aligned with the at least one trailing edge cooling channel relative to the stream-wise flow.

11. The turbine engine of claim 10 wherein the inlet of the at least one film hole is aligned with a centerline of the at least one trailing edge cooling channel relative to the stream-wise flow.

12. The turbine engine of claim 9 wherein the inlet is non-aligned with the at least one trailing edge cooling channel relative to the stream-wise flow.

13. The turbine engine of claim 9 wherein the airfoil is one of a rotating blade or a stationary vane.

14. The turbine engine of claim 9 wherein the at least one trailing edge cooling channel comprises multiple trailing edge cooling channels.

15. The turbine engine of claim 14 wherein the inlet is located between adjacent trailing edge cooling channels of the multiple trailing edge cooling channels.

16. The turbine engine of claim 15 wherein the at least one film hole comprises multiple film holes and the inlets are located between adjacent trailing edge cooling channels.

17. The turbine engine of claim 14 wherein the at least one film hole comprises multiple film holes and the inlets are located in stream-wise alignment with the trailing edge cooling channels.

18. The turbine engine of claim 9 wherein the airfoil is a blade.

* * * * *